United States Patent [19]

Stewart

[11] Patent Number: 4,961,675
[45] Date of Patent: Oct. 9, 1990

[54] ADJUSTABLE SET BACK CONTROL DEVICE

[75] Inventor: John F. Stewart, Lexington, S.C.

[73] Assignee: Cooper Industries, Inc., Houston, Tex.

[21] Appl. No.: 113,588

[22] Filed: Oct. 28, 1987

[51] Int. Cl.$^5$ ............................................. B23B 47/22
[52] U.S. Cl. ..................... 408/1 R; 408/17
[58] Field of Search ............... 408/14, 1 R, 16, 17, 408/110, 111, 97, 112, 241 R, 241 B, 241 G, 241 S, 72 R, 72 B, 137, 202; 409/218; 279/22, 30

[56] References Cited

U.S. PATENT DOCUMENTS

| | | | |
|---|---|---|---|
| 2,578,454 | 12/1951 | Saives | 408/17 X |
| 3,680,970 | 8/1972 | Deschner | 408/17 |
| 4,421,441 | 12/1983 | Hirose | 408/17 |
| 4,534,683 | 8/1985 | Colliau | 408/17 |

Primary Examiner—Z. R. Bilinsky
Attorney, Agent, or Firm—Eddie E. Scott; Alan R. Thiele; H. Elliott Cox

[57] ABSTRACT

A device for adjustably controlling the position and set-back of a piston rod which extends from a damping cylinder used on an airfeed peck drill. The device includes a plurality of ball members which surround the piston rod. The ball members are positioned against the piston rod by a spring biased cone having a tapered internal surface. The balls are further positioned with respect to the cone by a spring biased ball separator which is movable with respect to the cone by air pressure. The travel of the piston rod is made adjustable by a nut member threadably engaged with the housing.

13 Claims, 4 Drawing Sheets

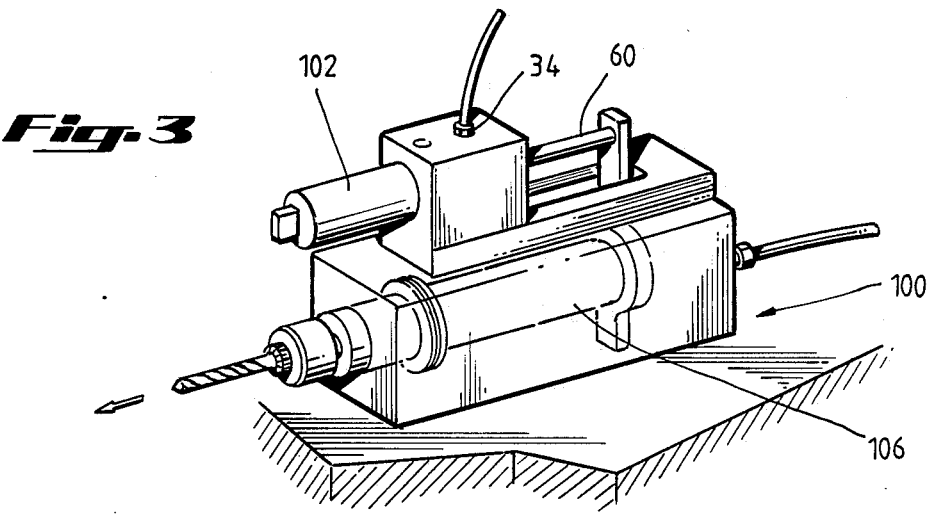
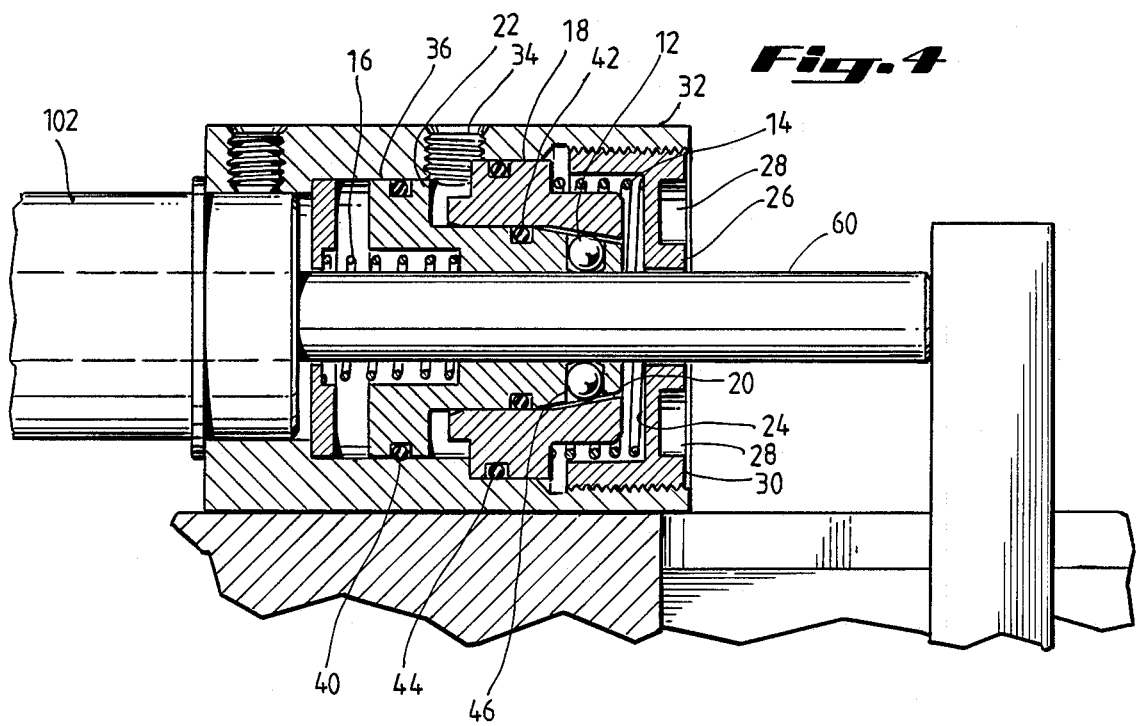

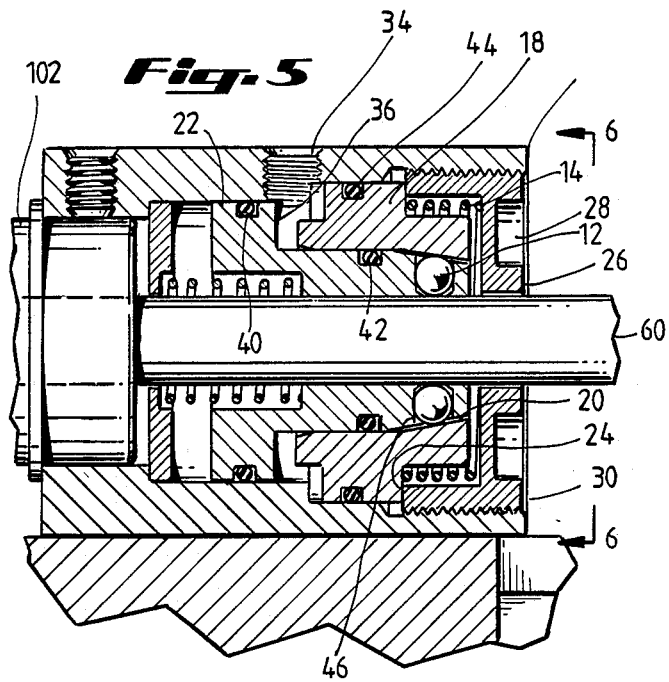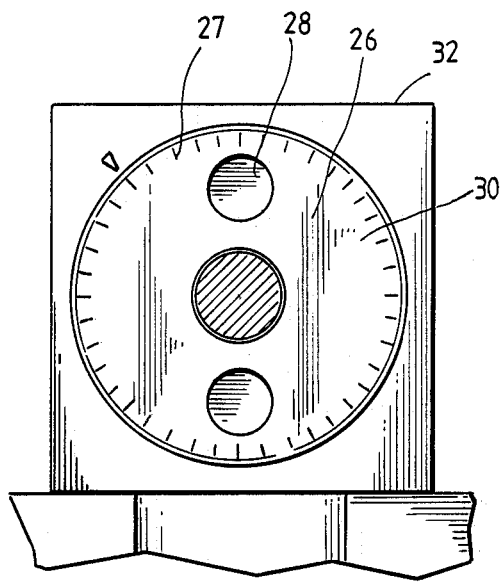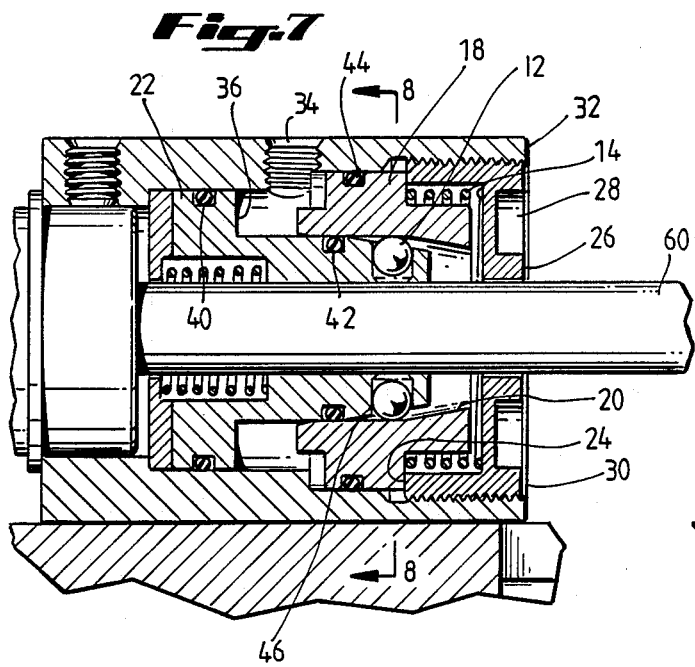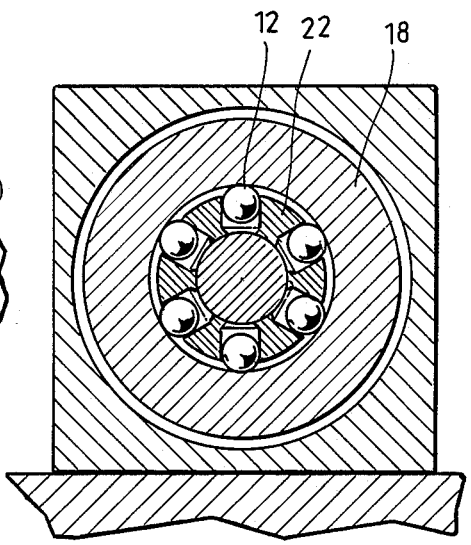

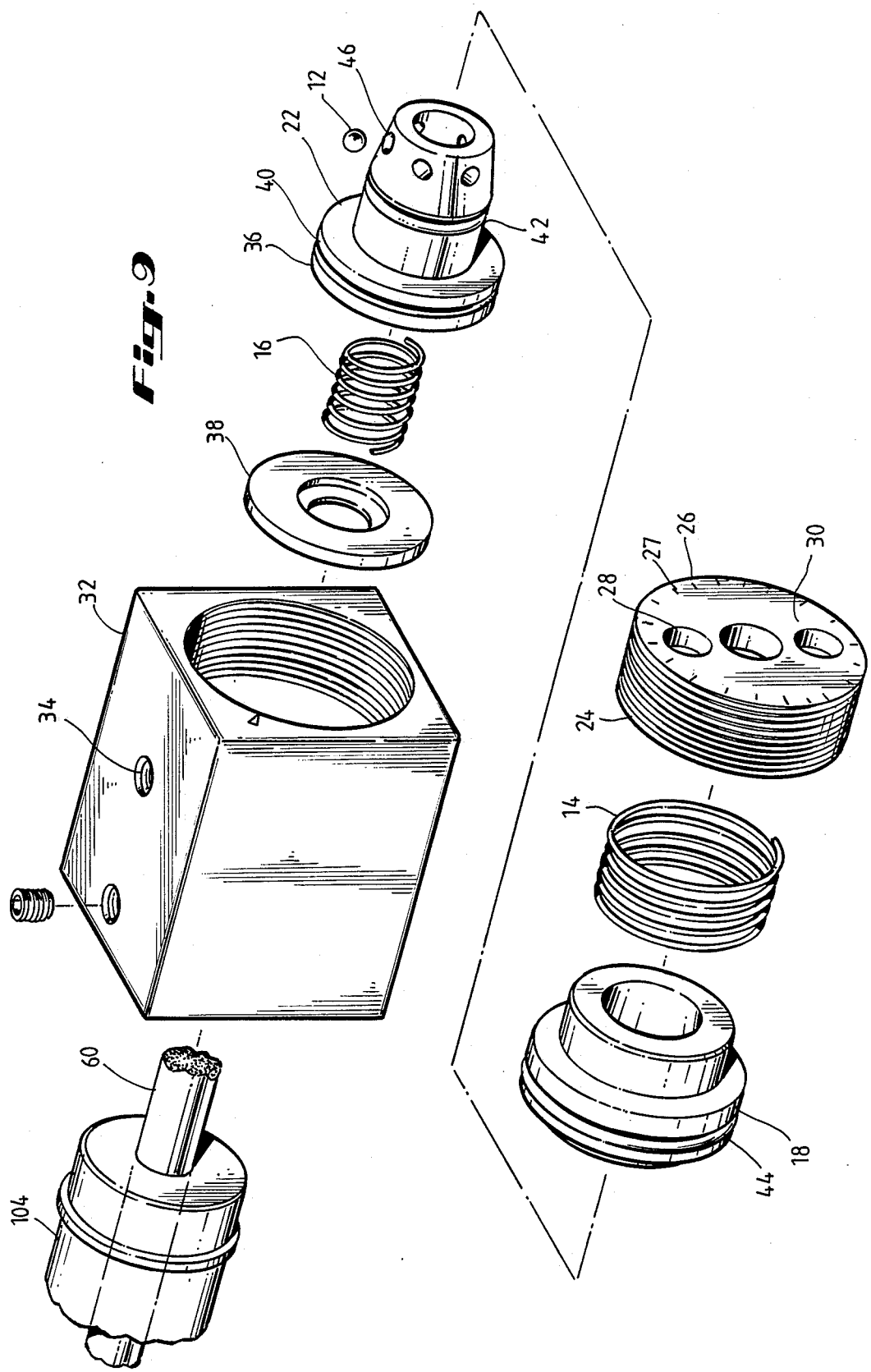

ADJUSTABLE SET BACK CONTROL DEVICE

BACKGROUND OF THE INVENTION

The present invention pertains to airfeed drills; more particularly, the device of the present invention relates to airfeed peck drills.

An airfeed peck drill is, in its simplest terms, an air driven rotary drill mounted on the front of an air driven power cylinder. The features of a peck drill which distinguish it from a continuous feed drill are the short period of contact of the drill with the workpiece, the repeated complete extraction of the drill from the hole being drilled and the repeated re-insertion of the drill into the hole being drilled. Drill travel speed into the workpiece is controlled by mechanical contact of the moving drill with the outboard end of a piston rod extending from a very accurate damping cylinder. A controlled leak around the piston in the damping cylinder enables the damping cylinder to provide a continuous moving counter-force to the force used to move the airfeed peck drill into the workpiece. In order for the drill travel speed control to remember the position of the drill while the airfeed peck drill is extracted and returned to the bottom of the hole being drilled, it is necessary to prevent rearward travel of the piston rod while the face of the drill bit is not in contact with the workpiece. The rearward travel of the piston rod is prevented by a device which has become known as a set-back control device. Further explanation of set-back control in airfeed peck drills may be found in U.S. Pat. Nos. 4,123,188 and 4,421,441.

The accurate control of airfeed peck drill travel is necessary to prevent improper drilling of holes or drill bit damage. Improper hole drilling or damage to drill bits usually occurs when a drill bit reengages material at the bottom of a hole under uncontrolled feed rate conditions. Such uncontrolled feeds normally occur just at the beginning of the compression of the fluid in the damping cylinder and during the period while the drill frame is loaded by thrust from the feed piston. Additionally, as the rotating drill contacts the workpiece, it causes both the fixture and the workpiece to deflect. When the rotating drill moves away from the fixture and the workpiece, the fixture and the workpiece return to an undeflected or relaxed condition. As the rotating drill moves back into the workpiece and contacts the bottom of the hole, the force of the drill tends to cause the fixture and the workpiece to separate. It is necessary that as force is placed against the bottom of the partially drilled hole that this is done under controlled feed conditions. Without adequate set back, this cannot be accomplished. To overcome these conditions, sufficient rearward movement or set back is required to allow the drill feed control mechanism to compensate for the periods of uncontrolled drill feed and fixture and workpiece deflection.

U.S. Pat. No. 3,680,970 to Deschner teaches an airfeed peck drill set back control device which has become a standard in the industry. This airfeed peck drill set back control device has two drawbacks. First, it is not adjustable, that is it cannot be made to compensate for differing periods of uncontrolled feed of fixture deflection allowed by the drill feed control mechanism and second it has a large extension which hangs off one side of the piston rod. This extension makes any airfeed peck drill incorporating this device difficult to use in confined areas.

There is therefore a need in the art to provide a set back control device which is adjustable and is smaller in size.

SUMMARY OF THE INVENTION

The airfeed peck drill set back control device of the present invention provides the adjustability and the reduced size needed by those drilling holes with airfeed peck drills. Specifically, the airfeed peck drill set back control device of the present invention accurately and adjustably controls the travel of the piston rod extending from the drill travel speed control damping cylinder by use of a plurality of ball members which surround and grab the piston rod thus enabling it to mechanically remember where the airfeed peck drill stopped before it was extracted from the workpiece. Additionally, various degrees of rearward travel of the piston rod are allowed by the adjustable nut at the rear of the set-back control device housing.

Within the set back control device of the present invention, a cone controls the radial position of the ball members with respect to the piston rod; that is, the cone surrounds the ball members such that their movement either into or out of frictional engagement with the sides of the piston rod is restricted. The axial position of the balls within the cone is controlled by a ball separator. The ball separator determines the position of the balls with respect to the tapered surface on the inside of the cone. This controlling of the position of the ball members with respect to the tapered surface on the inside of the cone controls the amount of force exerted by the ball members when moved into frictional engagement with the side of the piston rod.

The ball separator has a flanged end and sealingly engages a housing so that it may be positioned by air pressure. Movement of the ball separator within the housing causes the ball members to be released from their frictional contact with the sides of the piston rod.

An adjustable nut is located in one end of the housing to limit the travel of the cone. Such limitation on the travel of the cone provides accurate control over the set-back movement of the piston rod.

BRIEF DESCRIPTION OF THE DRAWINGS

A better understanding of the adjustable set back control device of the present invention may be had by reference to the drawings wherein:

FIG. 3 is a perspective view of a generic airfeed drill or peck drill with a set-back control mounted thereon;

FIG. 4 is a sectional view of the set back control device shown in FIG. 3;

FIG. 5 is a sectional view of the set back control device of the present invention showing engagement of the ball members with the control rod;

FIG. 6 is an end view of the set back control device at line 4—4 in FIG. 5;

FIG. 7 is a view similar to FIG. 5 with the ball members released from the control rod;

FIG. 8 is a sectional view taken at line 6—6 of FIG. 7; and

FIG. 9 is an exploded perspective view showing the assembly of the set back control device.

DESCRIPTION OF THE EMBODIMENTS

Figure 1:
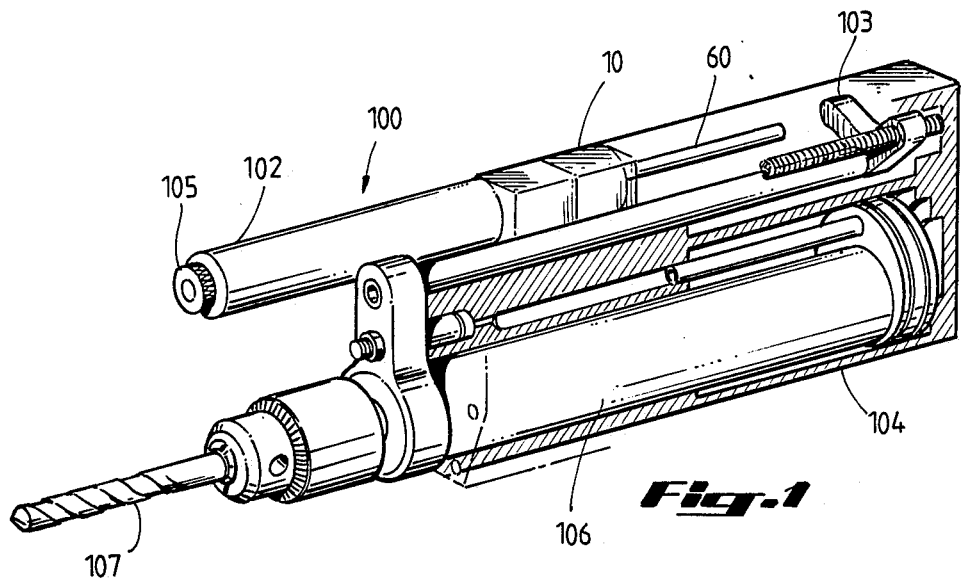
FIG. 1 is a cutaway perspective view of an airfeed peck drill system.

As previously explained in the background of the invention, it is necessary to accurately control the speed and depth of forward travel of airfeed peck drills 100. FIG. 1 illustrates how accurate control of position is accomplished by mechanical engagement of stop 103 with a travelling piston rod 60 which extends from damping cylinder 102. Air pressure acts on piston 104 which pushes drill quill 106 forward until stop 103 engages piston rod 60 which extends from damping cylinder 102. The speed of drill travel is governed by damping cylinder 102. Knob 105 is used to adjust the counter force exerted by damping cylinder 102. When the peck cycle is completed, air pushes against the front side of piston 104. This pulls drill quill 106 away from the workpiece. Because stop 103 follows drill quill 106, it moves away from the end of piston rod 60. Piston rod 60 would follow stop 103 were it not for set back control device 10 which limits the travel of piston rod 60 and thus remembers the position of piston rod 60 when quill 106 is caused to move rearward during a peck cycle.

Figure 2B:
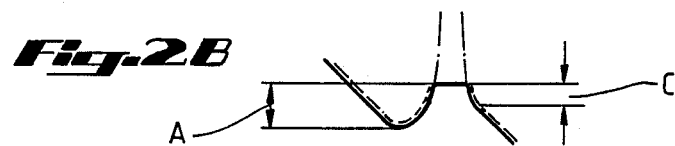
FIGS. 2A and 2B are graphs of piston rod travel and drill quill travel vs. time.
Figure 2A:
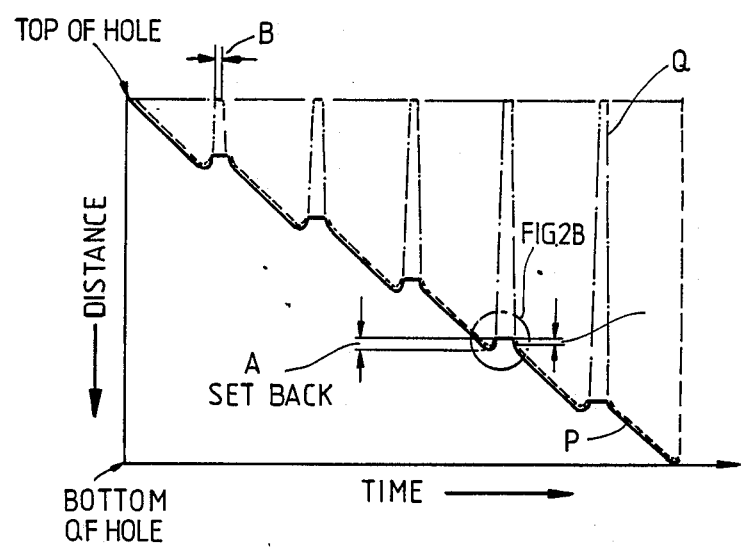

In FIG. 2 it may be seen that dotted line "Q" represents the travel of drill quill 106. The peaks indicate that drill quill 106 is fully extracted from the workpiece between drilling cycles. The solid line "P" represents the distance travelled by the end of piston rod 60. Letter "A" indicates the small backward movement of piston rod 60 before it is grabbed by setback control device 10. Letter "B" indicates the dwell of piston rod 60 during the period that drill quill 106 is withdrawn from the workpiece and reinserted. Letter "C" represents the uncontrolled feed of piston rod 60 caused by mechanically loading the structural components of airfeed peck drill 100, the non-linear travel of piston rod 60 during the initial compression of fluid and the reestablishment of fluid flow within damping cylinder 102 and the deflection of the fixture and the workpiece. The difference between "A" and "C" is a safety margin to assure that drilling does not begin until the drill is under controlled feed. This safety margin is established to be somewhat greater than the fixture and workpiece deflection. If drill 107 is allowed to contact the workpiece during this period of uncontrolled feed, an unsatisfactory hole will be drilled. The set-back control device of the present invention allows for adjusting the set back of piston rod 60 so that drill 107 does not contact the workpiece during the period of uncontrolled feed ("C" in FIG. 2).

In FIGS. 4 through 8 it may be seen that the set back control device of the present invention 10 frictionally engages the sides of piston rod 60 which extends from damping cylinder 102. Specifically, ball members 12 contact the sides of piston rod 60 as shown in FIG. 4. As peck drill 100 is feeding towards the workpiece under the force of power piston 104 at a rate controlled by the counter force of damping cylinder 102, the bias force of cone spring 14 is greater than the force of separator spring 16. This difference in spring force biases cone 18 in the direction of travel of the forward feed of peck drill 100 into the workpiece. This movement of cone 18 causes tapered internal surface 20 on inside of cone 18 to engage ball members 12, thus causing them to move radially inwardly into contact with piston rod 60. Separator spring 16 causes ball separator 22 to move opposite the direction of travel further moving ball members 12 into taper 20 on the inside of cone 18.

In FIG. 5, the set-back control device 10 is shown in the static condition between pecks of peck drill 100. The hydraulic return force of hydraulic cylinder 102 plus the bias of separator spring 16 causes cone 18 to move axially rearward until it contacts the inside face 24 of adjustable nut 26. Adjustable nut 26 is positioned by inserting a tool (not shown) into holes 28 in its outward face 30 to threadably move it into housing 32. Graduations 27 may be used to mark the position of nut 26. The inward radial force on balls 12 created by cone 18 prevents the continued outward travel of piston rod 60 thus causing the last position of piston rod 60 to be remembered with the addition of a predetermined length of set back.

In FIG. 7, the release condition is shown. As shown in FIG. 3, pressurized air is added through port 34 to enter housing 32. This pressurized air forces ball separator 22 in the direction of the feed of peck drill 100. This axial movement of ball separator 22 is caused by flanged end 36 of ball separator 22 which acts as a piston within housing 32. The axial movement of ball separator 22 in the direction of feed of peck drill 100 causes balls 12 to move radially outwardly within cone 18 thus freeing piston rod 60 for movement back toward the workpiece. Such outward radial movement of balls 12 is shown in FIG. 8.

A still better understanding of the construction of the adjustable set back control device 10 of the present invention may be had by reference to FIG. 9. Therein it may be seen that ball separator 22 abuts against disc 38 at the forwardmost point of its travel. Ball separator 22 is sealed within housing 32 by O-ring 40 and within cone 18 by O-ring 42. Similarily, cone 18 is sealed within housing 32 by O-ring 44. Balls 12 ride with ball slots 46 formed in ball separator 22. Housing 32 is sized uniformly about piston rod 60 and includes no unnecessary protuberances or extensions. While a rectangular housing 32 is shown, it is understood that a cylindrical or any convenient shape of housing may be used without departing from the spirit and scope of the invention.

As may be seen in FIGS. 5 and 7, it is possible to adjust the setback position of piston rod 60 by moving adjustable nut 26 in and out of housing 32.

There has now been provided by the present invention an adjustable, accurately controlled airfeed peck drill set back control device 10 of minimal size.

The foregoing specification describes the scope of the invention. Those of ordinary skill in the art will understand that further modifications may be made to the adjustable airfeed peck drill set back control device of the present invention without departing from its scope.

What is claimed is:

1. An adjustable set back control device for an airfeed peck drill whose drill travel speed is controlled with a damping cylinder having a movable piston rod, said adjustable set-back control device comprising;

a plurality of ball members positioned to surround and restrict the axial movement of the movable piston rod;

a first member for axially positioning said ball members with respect to the movable piston rod;

a second member for radially positioning said ball members with respect to the movable piston rod;

a hydraulic positioning means for selectively positioning said first member relative said second member; and a hydraulic actuation means for actuating said hydraulic positioning means;

so that the travel of the movable piston rod with respect to the clamping cylinder is limited.

2. The device as defined in claim 1 wherein said second member includes a tapered inner surface which causes said ball members to engage the movable piston rod.

3. The device as defined in claim 2 wherein said second member is positioned in part by a biasing spring.

4. The device as defined in claim 1 wherein said ball members are disposed about said movable piston rod in a ball separator.

5. The device as defined in claim 4 wherein said ball separator is positioned in part by a biasing spring.

6. The device as defined in claim 1 further including a housing.

7. The device as defined in claim 6 wherein said first member includes a piston which sealing engages the internal surface of said housing.

8. The device as defined in claim 6 wherein said first member is a threaded nut which surrounds the piston rod and threadably engages said housing.

9. The device as defined in claim 8 wherein the position of said threaded nut adjustably limits the axial travel of said second member.

10. The device as defined in claim 7 further including a threaded nut which threadably engages said housing, said threaded nut selectively disposable on said housing to limit the axial travel of said first member.

11. An adjustable set-back control device for an airfeed peck drill whose travel speed is controlled by a damping cylinder with a travelling piston rod, said adjustable set-back control device comprising:
 a plurality of ball members constructed and arranged to surround the travelling piston rod;
 a cone member having a tapered inner surface which rests against said ball members and controls the radial position of said ball members with respect to the travelling piston rod;
 a ball separation which controls the axial position of said ball members with respect to the travelling piston rod;
 a spring biasing means for positioning said cone member with respect to said ball members and said ball separator with respect to said cone member;
 a housing;
 said ball separator disposed to engage the internal walls of said housing so that air pressure may be used to axially position said ball separator within said housing;
 a nut member surrounding said control rod, said nut member disposed to be adjustably positioned with respect to said cone by threadable engagement with said housing.

12. The device as defined in claim 11 wherein said ball separator sealingly engages the inside of said housing and the inside surface of said cone member.

13. A method for adjustably controlling the position of a piston rod which controls the position of an airfeed peck drill, said method comprising the steps of:
 surrounding the piston rod with a plurality of ball members;
 controlling the axial position of said ball members with respect to the piston rod;
 controlling the radial position of said ball members with respect to the piston rod;
 biasing said ball members into contact with the piston rod so as to restrict the travel of the piston rod;
 using the application of air pressure to cause said biasing of the ball members out of contact with the piston rod;
 using an adjustable nut to limit the axial travel of said ball members with respect to the piston rod so that the length of travel of the piston rod may be selectively limited.

* * * * *